(12) United States Patent
Scarabelli et al.

(10) Patent No.: US 11,169,597 B2
(45) Date of Patent: Nov. 9, 2021

(54) METHOD OF GENERATING A VIRTUAL OVERLAY FOR A PACKAGING MACHINE

(71) Applicant: Tetra Laval Holdings & Finance S.A., Pully (CH)

(72) Inventors: Paolo Scarabelli, Reggio Emilia (IT); Alberto Cavani, Rubiera (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 16/650,329

(22) PCT Filed: Sep. 20, 2018

(86) PCT No.: PCT/EP2018/075465
§ 371 (c)(1),
(2) Date: Mar. 24, 2020

(87) PCT Pub. No.: WO2019/057817
PCT Pub. Date: Mar. 28, 2019

(65) Prior Publication Data
US 2020/0272224 A1    Aug. 27, 2020

(30) Foreign Application Priority Data

Sep. 25, 2017  (EP) ..................................... 17192883

(51) Int. Cl.
*G06F 3/00*    (2006.01)
*G06F 3/01*    (2006.01)
(Continued)

(52) U.S. Cl.
CPC .......... *G06F 3/011* (2013.01); *G02B 27/0172* (2013.01); *G06Q 10/087* (2013.01);
(Continued)

(58) Field of Classification Search
None
See application file for complete search history.

(56) References Cited

U.S. PATENT DOCUMENTS

2017/0108577 A1*  4/2017  Loverich ............ G06Q 10/0833
2017/0210500 A1*  7/2017  Sytema ................. B65B 11/004
2017/0217620 A1*  8/2017  Zeilstra ................ G05B 19/402

FOREIGN PATENT DOCUMENTS

EP    3 200 036    8/2017

OTHER PUBLICATIONS

Zdenek Tuma et al., "The Process Simulation Using by Virtual Reality," Procedia Engineering vol. 69, pp. 1015-1020 (2014).
(Continued)

*Primary Examiner* — Martin Mushambo
(74) *Attorney, Agent, or Firm* — Knobbe Martens Olson & Bear LLP

(57) ABSTRACT

A method is disclosed for generating a virtual overlay for a packaging machine having a plurality of movable objects manipulating packaging containers, comprising associating the movable objects with respective object identifier data communicated in the packaging machine, determining a relative position of a target object amongst the movable objects in a physical coordinate system of the packaging machine based on the object identifier data, registering imaging data comprising at least part of the movable objects or a defined physical reference, mapping the relative position of the target object to a virtual coordinate system in an at least partly virtual environment viewed by a user, comprising correlating the relative position of the target object to the imaging data, whereby the target object is assigned to a virtual target coordinate in the virtual coordinate system, and displaying the virtual overlay in the virtual coordinate system in relation to the virtual target coordinate.

20 Claims, 3 Drawing Sheets

(51) Int. Cl.
G06T 7/73 (2017.01)
G02B 27/01 (2006.01)
G06Q 10/08 (2012.01)
G06T 19/00 (2011.01)
G06T 19/20 (2011.01)

(52) U.S. Cl.
CPC .............. *G06T 7/74* (2017.01); *G06T 19/006* (2013.01); *G06T 19/20* (2013.01)

(56) References Cited

OTHER PUBLICATIONS

International Search Report and Written Opinion; International App. No. PCT/EP2018/075465; dated Oct. 17, 2018; 10 pages.
Extended European Search Report; European App. No. 17192883.1; dated Dec. 6, 2017; 7 pages.

* cited by examiner

METHOD OF GENERATING A VIRTUAL OVERLAY FOR A PACKAGING MACHINE

TECHNICAL FIELD

The present invention generally relates to the field of augmented reality. More particularly, the present invention relates to a method of generating a virtual overlay for a packaging machine having a plurality of movable objects manipulating packaging containers, a related system for generating a virtual overlay and a packaging machine comprising such system.

BACKGROUND

Augmented reality is a growing field and presents the user with virtual reality elements while viewing and interacting with the physical reality. The virtual elements may guide the user in various ways and present information to the user to facilitate interaction with various objects in the real world. Augmented reality applications typically apply various image recognition processes to identify physical objects and search for matches in databases to find object data that correspond to the obtained image data of the current object. The unique object may subsequently be highlighted and the user may be presented with information about its properties and/or guide the user how to interact with the object. A problem arises in manufacturing industries such as in the packaging industry where a multitude of objects in a machine, for e.g. manipulating packaging containers, are not easily distinguishable from one another, and may be moving at high speeds. This puts high demands on image processing techniques, and the implementation of augmented reality in such environments may accordingly be complex and not sufficiently reliable.

It would thus be advantageous with an improved method of generating a virtual overlay for a packaging machine, in particular allowing for avoiding more of the above-mentioned problems and compromises, including enhancing the use of augmented reality, such as providing a faster and more reliable implementation thereof.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a method is provided for generating a virtual overlay for a packaging machine having a plurality of movable objects manipulating packaging containers. The method comprises associating the movable objects with respective object identifier data communicated in the packaging machine, determining a relative position of a target object amongst the movable objects in a physical coordinate system of the packaging machine based on the object identifier data, registering imaging data comprising at least part of the movable objects or a defined physical reference, mapping the relative position of the target object to a virtual coordinate system in an at least partly virtual environment viewed by a user, comprising correlating the relative position of the target object to the imaging data, whereby the target object is assigned to a virtual target coordinate in the virtual coordinate system, and displaying the virtual overlay in the virtual coordinate system in relation to the virtual target coordinate of the target object.

According to a second aspect a computer program product comprising instructions which, when the program is executed by a computer, cause the computer to carry out the steps of the method according to the first aspect.

According to a third aspect a system is provided for generating a virtual overlay for a packaging machine having a plurality of movable objects manipulating packaging containers. The system comprises a processing unit configured to associate the movable objects with respective object identifier data communicated in the packaging machine, determine a relative position of a target object amongst the movable objects in a physical coordinate system of the packaging machine based on the object identifier data, an imaging device configured to register imaging data comprising at least part of the movable objects or a defined physical reference, wherein the processing unit is configured to map the relative position of the target object to a virtual coordinate system in an at least partly virtual environment viewed by a user by being configured to correlate the relative position of the target object to the imaging data, whereby the target object is assigned to a virtual target coordinate in the virtual coordinate system, and a display unit configured to display the virtual overlay in the virtual coordinate system in relation to the virtual target coordinate of the target object.

According to a fourth aspect a packaging machine is provided comprising a system according to the third aspect.

Further examples of the invention are defined in the dependent claims, wherein features for the second and subsequent aspects of the disclosure are as for the first aspect mutatis mutandis.

Some examples of the disclosure provide for an improved and more intuitive method for localizing fault in a packaging machine.

Some examples of the disclosure provide for less time-consuming trouble-shooting of a packaging machine.

Some examples of the disclosure provide for improved real-time monitoring and analysis on-the-fly of moving components in a packaging machine.

Some examples of the disclosure provide for facilitated condition monitoring and process control in a packaging machine.

Some examples of the disclosure provide for facilitated interaction with packaging machine components during maintenance or process control.

Some examples of the disclosure provide for facilitating retrieval of diagnostic information in a packaging machine.

Some examples of the disclosure provide for aiding prioritization of maintenance tasks in a packaging machine.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
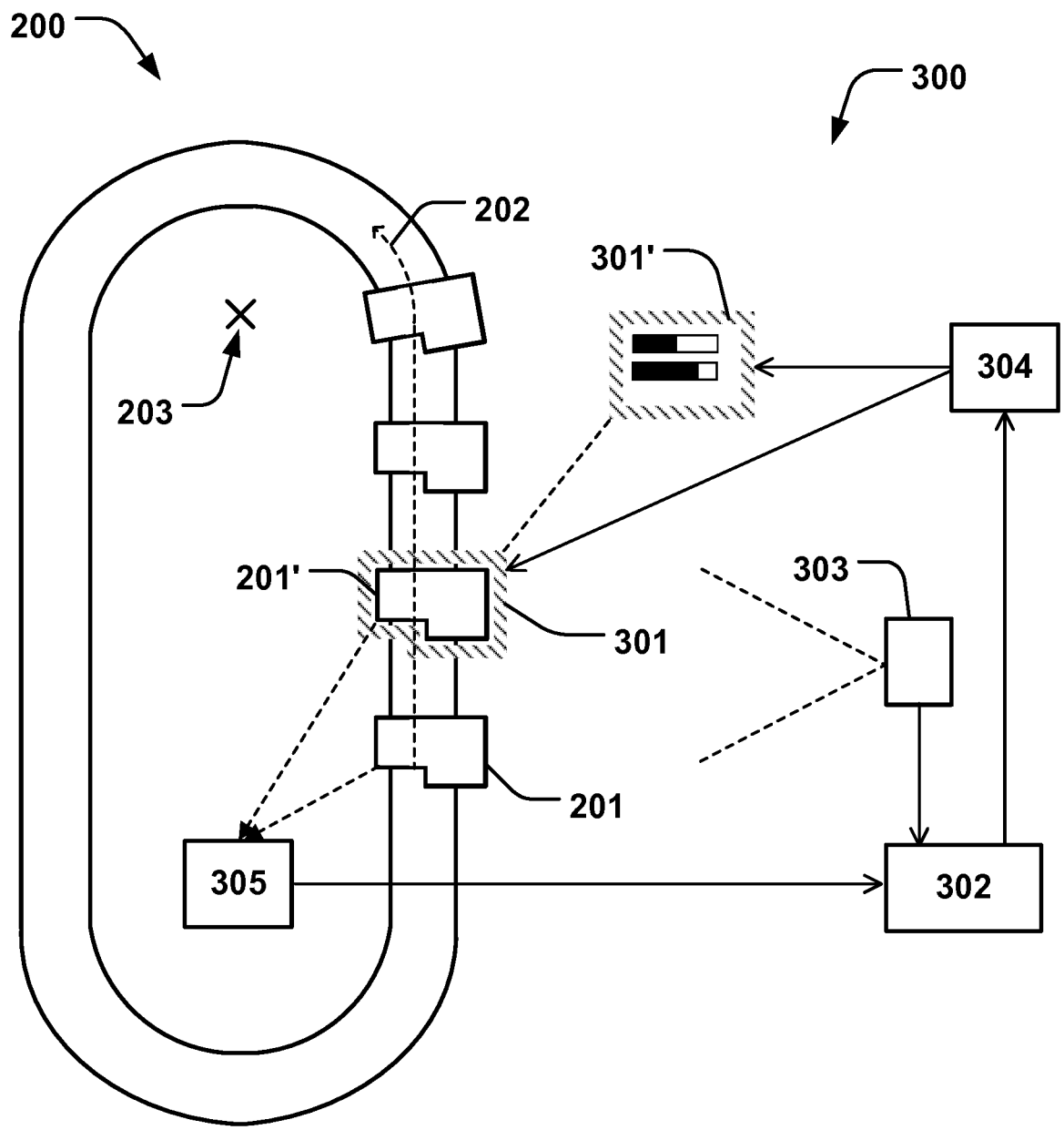
FIG. 1 is a schematic illustration of a system for generating a virtual overlay for a packaging machine having a plurality of movable objects, according to examples of the disclosure.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 2:
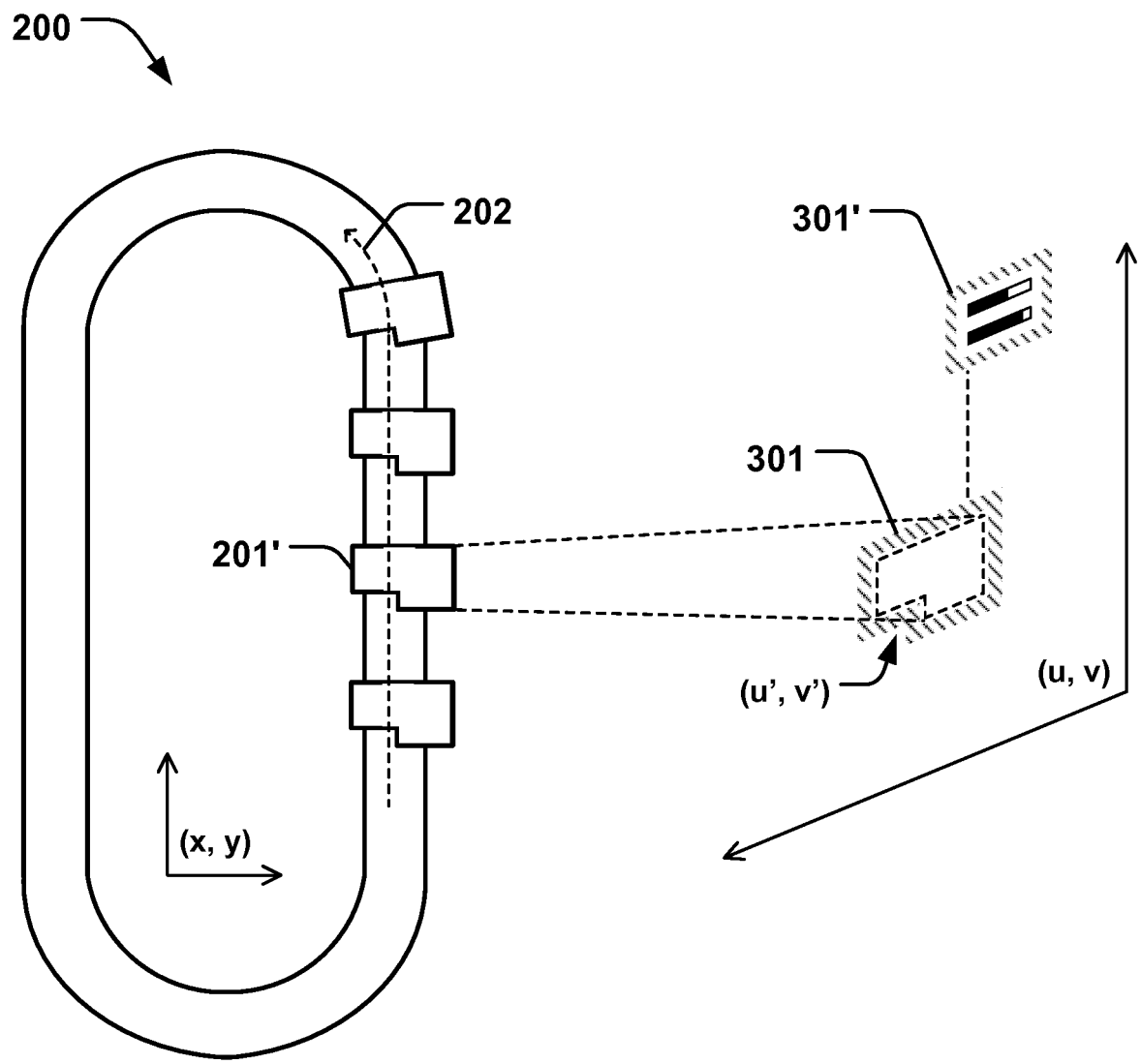
FIG. 2 is a schematic illustration of a system for generating a virtual overlay for a packaging machine having a plurality of movable objects, and a virtual coordinate system, according to examples of the disclosure.

FIG. 1 is a schematic illustration of a system 300 for generating a virtual overlay 301, 301', for a packaging machine 200 having a plurality of movable objects 201, 201', configured to manipulate packaging containers. A corresponding method of generating the virtual overlay 301, 301', for a packaging machine 200 is illustrated in the flow chart of FIG. 3a-b, and will be referred to further below. The movable objects 201, 201', may be carts moving along a path 202 and may interact with packaging containers (not shown) in various ways, e.g. by moving the packaging containers or components thereof along said path 202. The path 202 may be a continuous, endless track, such as an elliptical track illustrated in FIG. 1, in which case the movable objects 201, 201', may circulate the track at high speed for different packaging applications. The system 300 comprises a processing unit 302 configured to associate the movable objects 201, 201', with respective object identifier data communicated in the packaging machine 200. The object identifier data may comprise machine address information about the positions of the movable objects 201, 201', when moving along the path 202. The object identifier data may be communicated from a native automation control system 305 of the packaging machine 200. The processing unit 302 is configured to determine a relative position of a target object 201' amongst the movable objects in a physical coordinate system (x, y) of the packaging machine 200 based on the object identifier data. Thus, the relative position of a particular target object 201' may be determined from the object identifier data communicated in the packaging machine 200, e.g. by the native automation control system 305. FIGS. 1 and 2 show schematic illustrations of a target object 201' positioned in the packaging machine 200, amongst other movable objects 201. It should be understood that the number of movable objects 201 moving along the path 201 may be any plurality and that the relative positions of several target objects 201' may be determined based on respective object identifier data. The system 300 comprises an imaging device 303 configured to register imaging data comprising at least part of the movable objects 201, 201'. Alternatively, or in addition, the imaging device 303 is configured to register imaging data comprising a defined physical reference 203. The defined physical reference may comprise any object with a defined physical coordinate, or plurality of objects with defined physical coordinates, in the physical coordinate system (x, y). The defined physical reference 203 may be static. The imaging device 303 may comprise an image sensor configured to capture images of the movable objects 201, 201'. Some movable objects 201, 201', or at least portions thereof, may be intermittently obscured when moving along the path 201. The processing unit 302 is configured to map the relative position of the mentioned target object 201' to a virtual coordinate system (u, v) in an at least partly virtual environment viewed by a user. The virtual coordinate system (u, v) is schematically illustrated in FIG. 2. The processing unit 302 is thus configured to correlate the relative position of the target object 201' to the imaging data captured by the imaging device 303. For example, the imaging device 303 may capture image data comprising a set of movable objects 201, 201', arranged in a certain order along the path 202 of the packaging machine 200. The relative position of a target object 201' in relation to the other movable objects 201 has been determined from the object identifier data communicated from the packaging machine 200. The processing unit 302 is then configured to compare said relative position with the obtained image data of the set of movable objects, and identify the target object 201' amongst the set of movable objects. The target object is thus assigned to a virtual target coordinate (u', v') in the virtual coordinate system (u, v), as schematically illustrated in FIG. 2. Alternatively, or in addition, the relative position of a target object 201' in relation to the defined physical reference 203 may be determined. The processing unit 302 is then configured to compare said relative position with the obtained image data of the defined physical reference 203, and identify the corresponding virtual target coordinate (u', v') of the target object 201'. In this case the virtual target coordinate (u', v') may be determined even if the movable objects 201, 201', are obscured. Similarly, in case the user is positioned so that any defined (static) physical reference 203 is obscured or unavailable, image data comprising at least part if the movable objects 201, 201', may be utilized to determine the virtual target coordinate (u', v') as exemplified above. The system 300 comprises a display unit 304 configured to display the mentioned virtual overlay 301, 301', in the virtual coordinate system (u, v) in relation to the virtual target coordinate (u', v') of the target object 201'.

FIGS. 1 and 2 show a virtual overlay 301, 301', positioned in relation to the target object 201'. It is thus possible to distinguish a target object 201', or a plurality of target objects 201', in the packaging machine 200 by correlating the relative position of the target object 201', obtained from the object identifier data, to the imaging data. A virtual overlay 301, 301', may thus be readily displayed in relation to the virtual target coordinate (u', v') although the target object 201' may be identical to the other movable objects 201 in the packaging machine 200. This also provides for faster image processing of the imaging data since less computational resources has to be spent on distinguish the images of similarly looking objects. There is further no need to introduce markers or the like to enable object recognition, which also alleviate the image processing requirements. A faster and more robust identification of a target object 201' may thus be provided. A reliable augmented reality application may thus be realized for the packaging machine 200, with a virtual overlay positioned in relation to the virtual target coordinate (u', v'). This opens for a facilitated interaction with the packaging machine 200, such as facilitated process control, monitoring and maintenance operations. The user may be presented with a virtual overlay 301, 301', in the display unit 304 anchored to a particular target object 201', that draws attention to e.g. the status of a current process parameter or a malfunctioning related to the target object 201'. Various sensors in the packaging machine 200 may be configured to retrieve such parameters or status of the respective movable objects 201, 201', and may communicate the related sensor data to the native automation control system 305 of the packaging machine 200. If a particular parameter needs attention, or if a malfunction has been detected, for a particular movable object or objects (i.e. a target object 201'), based on analysis of the sensor data, the associated object identifier data may be utilized, as described above, to correlate the relative position thereof with imaging data that has been captured of the movable objects 201 to determine the virtual target coordinate (u', v'). A virtual overlay 301, 301', may then be displayed in relation to this coordinate to bring the user's attention to where the target object 201' is located in the packaging machine 200, for quick and intuitive maintenance or process monitoring.

Figure 3A:
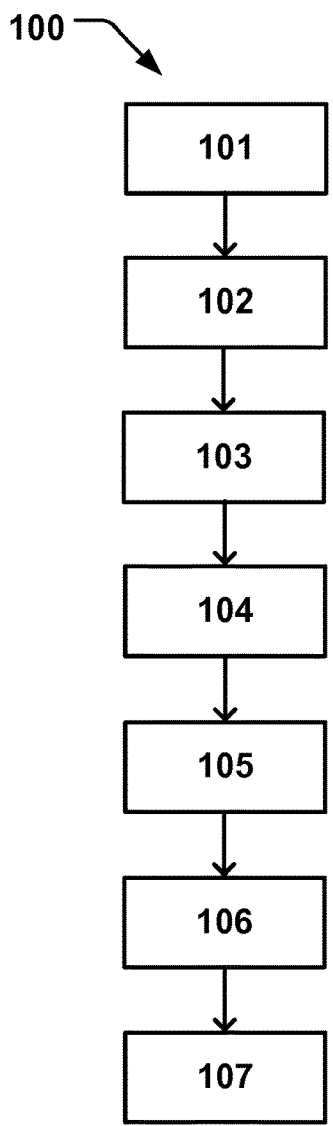
FIG. 3a is a flowchart of a method of generating a virtual overlay for a packaging machine according to examples of the disclosure.

FIG. 3a illustrates a flow chart of a related method 100 of generating a virtual overlay 301, 301', for a packaging machine 200 having a plurality of movable objects 201, 201', manipulating packaging containers (not shown). The order in which the steps of the method 100 are described and illustrated should not be construed as limiting and it is conceivable that the steps can be performed in varying order. The method 100 thus comprises associating 101 the movable objects 201, 201', with respective object identifier data communicated in the packaging machine 200, determining 102 a relative position of a target object 201' amongst the movable objects 201, 201', in a physical coordinate system (x, y) of the packaging machine 200 based on the object identifier data, registering 103 imaging data comprising at least part of the movable objects 201, 201', and/or a defined physical reference 203. The method 100 comprises mapping 104 the relative position of the target object 201' to a virtual coordinate system (u, v) in an at least partly virtual environment viewed by a user. The mapping 104 comprises correlating 105 the relative position of the target object 201' to the imaging data, so that the target object 201' is assigned 106 to a virtual target coordinate (u', v') in the virtual coordinate system (u, v). The method 100 comprises displaying 107 the virtual overlay 301, 301', in the virtual coordinate system (u, v) in relation to the virtual target coordinate (u', v') of the target object 201'. The method 100 thus provides for the advantageous benefits as described above in relation to the system 300 and FIGS. 1-2.

The processing unit 302 may be configured to correlate the relative position of the target object 201' to the imaging data when the movable objects 201, 201', are moving along a path 202 in the packaging machine 200 so that the target object 201' is tracked along said path 202. The virtual target coordinate (u', v') may thus be continuously updated with the movement of the target object 201' so that the virtual overlay 301, 301', may follow the mentioned movement for display in relation to the virtual target coordinate (u', v'). The object identifier data may be continuously communicated to the processing unit 302 during operation of the packaging machine 200, as the movable objects 201 are moving, so that the relative position of the target object 201' is updated. The imaging device 303 may accordingly be configured to continuously capture imaging data of the moving objects 201, so that the stream of imaging data may be compared to a real-time update of the relative position, for identifying the target object 201' as it moves in the packaging machine 200 and its related virtual target coordinate (u', v'). The display unit 304 may accordingly be configured to update the position of the virtual overlay 301, 301', to the momentaneus position of the determined virtual target coordinate (u', v'). This provides for tracking a target object 201' in the packaging machine 200 in a reliable manner with a minimized risk of losing track of the target object 201', which otherwise is a particular challenge for traditional image processing techniques relying on continuous object recognition for the tracking process, as the speed of the movable objects may be too high and the shape of the movable objects 201 may be substantially identical in such packaging machine 200. Improved real-time monitoring, process control and on-the-fly analysis of moving objects 201 in a packaging machine 200 may thus be provided.

Figure 3B:
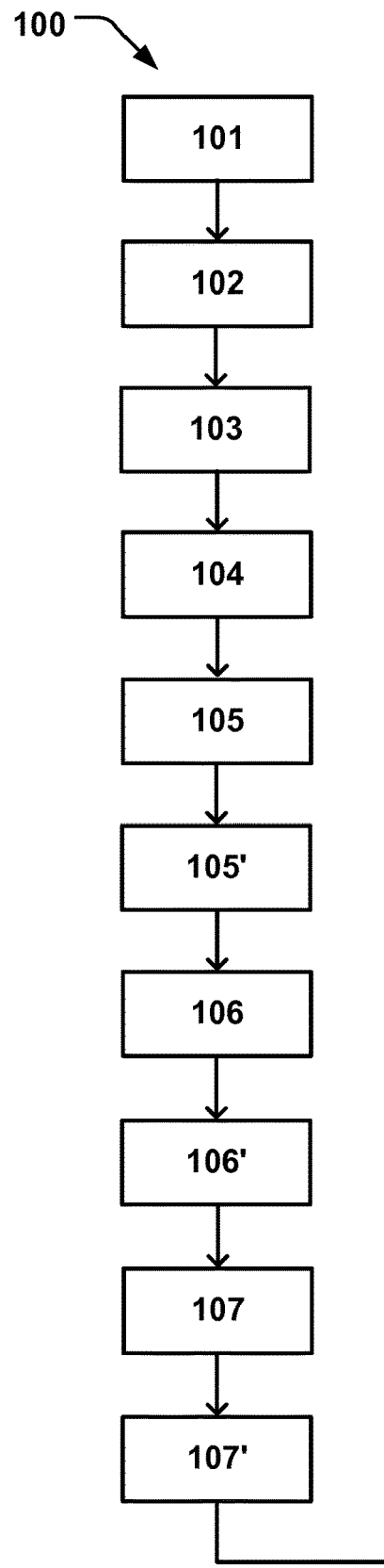
FIG. 3b is a flowchart of a method of generating a virtual overlay for a packaging machine according to examples of the disclosure.

FIG. 3b illustrates a further flow chart of a method 100 of generating a virtual overlay 301, 301', for a packaging machine 200. The order in which the steps of the method 100 are described and illustrated should not be construed as limiting and it is conceivable that the steps can be performed in varying order. The method 100 may thus comprise correlating 105' the relative position of the target object 201' to the imaging data when the movable objects 201 are moving along a path 202 in the packaging machine 200 so that the target object 201' is tracked along said path 202.

The method 100 may accordingly also comprise displaying 107' the virtual overlay 301, 301', in relation to the virtual target coordinate (u', v') of the target object 201' when moving along said path 202.

The display unit 304 may be configured to display a virtual overlay comprising a visual indicator 301' of process parameters associated with the target object 201' and/or the packaging machine 200. A visual indicator 301' of a process parameter could for example indicate the number of cycles that are completed in the packaging machine 200 before inspection is required, operating time, or show various diagnostic information or status of electrical or mechanical parameters, or other sensor data etc. The visual indicator 301' may be presented at a defined distance from the target object 201 and the virtual target coordinate (u', v') thereof, as schematically shown in e.g. FIG. 2. Several visual indicators 301' of process parameters etc may be aligned in the virtual coordinate system (u, v) for display in the display unit 304. A plurality of visual indicators 301' associated with different target objects 201' may also be displayed simultaneously, and/or in combination with visual indicators 301' showing parameters related to the overall process or packaging machine 200.

The virtual overlay 301 may comprise a visual highlight 301 displayed around at least part of a contour of the target object 201', as schematically illustrated in FIGS. 1-2. The target object 201' may thus be easily identified in the packaging machine 200. As mentioned above, the visual highlight 301 may also track the target object 201' when moving in the packaging machine 200. Several target objects 201' of a plurality of movable objects 201 in the packaging machine 200 may be simultaneously marked with the visual highlight 301. It is conceivable that the visual highlights may be color coded in such example, e.g. with the purpose to facilitate user prioritization amongst several target objects 201'. For example, one color of the visual highlight 301 may be associated with the need for critical attention to the target object 201' and another color that signals normal operating conditions, and further colors that signals intermediate states.

The method 100 may comprise registering 108 user input from a user interaction with the virtual overlay 301, 301'. Thus, a user may provide input to a virtual element of the virtual overlay 301, 301', to e.g. scroll through different displayed parameters or send commands to the packaging machine 200. In the latter case, the imaging device 303 may be configured to detect user gestures in the vicinity of specific virtual elements of the virtual overlay 301, 301', to register a user input, and subsequently communicate the input to the packaging machine 200 via the processing unit 302. This provides for an intuitive and facilitated process control.

The method 100 may comprise determining 109 a position of the target object 201' in the virtual coordinate system (u, v) by comparing relative positions in the physical coordinate system (x, y) of the target object 201' and an adjacent movable object 201. The position of the target object 201' in relation to another movable object 201 may thus be determined. The method 100 may further comprise determining 110 a corresponding relative position of the target object 201', in the virtual coordinate system (u, v), in relation to a virtual coordinate assigned to the adjacent movable object 201 based on imaging data registered for the adjacent movable object 201. It is thus possible to determine the virtual coordinates (u', v') of the target object, even in the case the target object 201' would be obscured in the packaging machine 200, so that the imaging device 303 could not capture imaging data thereof. This is possible since imaging data may be captured of the adjacent object 201, not being obscured, and the position of the adjacent object 201 in the physical coordinate system (x, y) may be determined by correlating the imaging data with the associated object identifier data of the adjacent object 201. And since the relative position between the target object 201' and the adjacent object 201 in the physical coordinate system (x, y) can be determined, based on the object identifier data of the target object 201', it is possible to determine a corresponding relative position in the virtual coordinate system (u, v), giving the virtual target coordinates (u', v') of the target object 201' even if obscured. The associated virtual overlay 301, 301', may then be presented as described above and it is possible for the user to see where the target object 201' is positioned within the packaging machine 200. The mentioned adjacent object 201 may correspond to any of the movable objects 201 in the packaging machine.

The method 100 may comprise determining 106' the virtual target coordinate (u', v') by comparing positions of the movable objects 201, 201', in the imaging data, assigned to respective virtual coordinates, with the relative position of the target object 201'. The imaging device 303 may detect a plurality of movable objects 201, and the respective virtual coordinates may be subsequently compared to the relative position of the target object 201' determined form the object identifier data in the physical coordinate system (x, y). The virtual coordinate with the closest correspondence to the relative position of the target object 201' may be assigned as the virtual target coordinate (u', v'). This may provide for a further improved display of a virtual overlay 301, 301', in the packaging machine 200.

The movable objects 201, 201', may have substantially identical shapes. Although different shapes may be present, the differences may be difficult to distinguish from a distance of the packaging machine, at a position where the user is located. Hence, as elucidated above, the method 100 and system 300 provides for generating a virtual overlay 301, 301', regardless if the movable objects 201, 201', have perceived identical shapes from a position of the user.

The imaging device 303 may comprise a wearable display device such as wearable glasses. The display unit 304 may be integrated in such wearable imaging device 303. I.e. the wearable device may capture the imaging data and also present the user with the virtual overlay 301, 301'. The above mentioned advantages of an alleviated demand on image processing capabilities provides for implementation of augmented reality in a packaging machine with less resources since less complex imaging devices may utilized while still providing for a robust augmented reality experience as elucidated above.

A computer program product is provided comprising instructions which, when the program is executed by a computer, cause the computer to carry out the steps of the method 100 as described above in relation to FIGS. 1-3.

A packaging machine 200 is also provided comprising a system 300 as described above in relation to FIGS. 1-2. The packaging machine 200 thus provides for the advantageous benefits as described above in relation to the system 300 and FIGS. 1-2.

As mentioned, the packaging machine 200 has a plurality of movable objects 201, 201', manipulating packaging containers. The packaging machine 200 thus comprises a system 300 for generating a virtual overlay 301, 301', therein. The system 300 comprises a processing unit 302 configured to associate 101 the movable objects 201, 201', with respective object identifier data communicated in the packaging machine 200. The processing unit 302 is configured to determine 102 a relative position of a target object 201' amongst the movable objects in a physical coordinate system (x, y) of the packaging machine 200 based on the object identifier data. The system 300 comprises an imaging device 303 configured to register imaging data comprising at least part of the movable objects 201, 201', and/or a defined physical reference 203. The processing unit 302 is configured to map 104 the relative position of the target object 201' to a virtual coordinate system (u, v) in an at least partly virtual environment viewed by a user by being configured to correlate 105 the relative position of the target object 201' to the imaging data. The target object 201' is assigned 106 to a virtual target coordinate (u', v') in the virtual coordinate system, and a display unit 304 is configured to display the virtual overlay 301, 301', in the virtual coordinate system (u, v) in relation to the virtual target coordinate (u', v') of the target object 201'. The packaging machine 200 thus provides for the advantageous benefits as described above in relation to the system 300 and FIGS. 1-2.

The present invention has been described above with reference to specific examples. However, other examples than the above described are equally possible within the scope of the invention. The different features and steps of the invention may be combined in other combinations than those described. The scope of the invention is only limited by the appended patent claims.

More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

The invention claimed is:

1. A method of generating a virtual overlay for a packaging machine comprising a plurality of movable objects manipulating packaging containers, the method comprising:
   associating the movable objects with respective object identifier data communicated in the packaging machine, the movable objects moving along a closed path in the packaging machine, determining a relative position of a target object amongst the movable objects in a physical coordinate system of the packaging machine based on the object identifier data, registering imaging data comprising at least part of the movable objects or a defined physical reference, mapping the relative position of the target object to a virtual coordinate system in an at least partly virtual environment viewed by a user, the mapping comprising correlating the relative position of the target object to the imaging data, whereby the target object is assigned to a virtual target coordinate in the virtual coordinate system, and displaying the virtual overlay in the virtual coordinate system in relation to the virtual target coordinate of the target object, the virtual overlay being anchored to the virtual target coordinate of the target object as the target object moves along the closed path.

2. The method according to claim 1, further comprising:
correlating the relative position of the target object to the imaging data when the movable objects are moving along the closed path in the packaging machine so that the target object is tracked along said closed path.

3. The method according to claim 2, further comprising:
displaying the virtual overlay anchored to a representation of the target object when the moveable objects are moving along said closed path.

4. The method according to claim 1, wherein the virtual overlay comprises a visual highlight displayed around at least part of a contour of the target object.

5. The method according to clam 1, wherein the virtual overlay comprises a visual indicator of process parameters associated with at least one of the target object or the packaging machine.

6. The method according to claim 1, further comprising:
registering user input from a user interaction with the virtual overlay.

7. The method according to claim 1, further comprising:
determining a position of the target object in the virtual coordinate system by comparing relative positions in the physical coordinate system of the target object and an adjacent movable object, and determining a corresponding relative position of the target object, in the virtual coordinate system, in relation to a virtual coordinate assigned to the adjacent movable object based on imaging data registered for the adjacent movable object.

8. The method according to clam 1, further comprising:
determining the virtual target coordinate by comparing positions of the movable objects in the imaging data assigned to respective virtual coordinates with the relative position of the target object.

9. A non-transitory computer readable storage medium storing instructions which, when executed by a processor, cause the processor to carry out the method according to claim 1.

10. The method according to clam 1, wherein the movable objects comprise carts, and wherein the object identifier data comprises machine address information associated with positions of the movable objects moving along the closed path.

11. A system for generating a virtual overlay for a packaging machine comprising a plurality of movable objects manipulating packaging containers, the system comprising:

a processor configured to:

associate the movable objects with respective object identifier data communicated in the packaging machine, the moveable objects configured to move along a closed path in the packaging machine, and determine a relative position of a target object amongst the movable objects in a physical coordinate system of the packaging machine based on the object identifier data, an imaging device configured to register imaging data comprising at least part of the movable objects or a defined physical reference, wherein the processor is further configured to:

map the relative position of the target object to a virtual coordinate system in an at least partly virtual environment viewed by a user by being configured to correlate the relative position of the target object to the imaging data, whereby the target object is assigned to a virtual target coordinate in the virtual coordinate system, and a display configured to display the virtual overlay in the virtual coordinate system in relation to the virtual target coordinate of the target object, the virtual overlay being anchored to the virtual target coordinate of the target object as the target object moves along the closed path.

12. The system according to claim 11, wherein the processor is configured to correlate the relative position of the target object to the imaging data when the movable objects are moving along the closed path in the packaging machine so that the target object is tracked along said closed path.

13. The system according to claim 11, wherein the display is configured to display the virtual overlay comprising a visual indicator of process parameters associated with at least one of the target object or the packaging machine.

14. The system according to claim 11, wherein the movable objects have substantially identical shapes.

15. The system according to claim 11, wherein the imaging device comprises a wearable display device.

16. A packaging machine comprising the system according to claim 11.

17. A packaging machine comprising:
a plurality of movable objects configured to move along a closed path and manipulate packaging containers, a processor configured to:

associate the movable objects with respective object identifier data communicated in the packaging machine, and determine a relative position of a target object amongst the movable objects in a physical coordinate system of the packaging machine based on the object identifier data, an imaging device configured to register imaging data comprising at least part of the movable objects or a defined physical reference, wherein the processor is further configured to:

map the relative position of the target object to a virtual coordinate system in an at least partly virtual environment viewed by a user by being configured to correlate the relative position of the target object to the imaging data, whereby the target object is assigned to a virtual target coordinate in the virtual coordinate system, and a display configured to display a virtual overlay in the virtual coordinate system in relation to the virtual target coordinate of the target object, the virtual overlay being anchored to the virtual target coordinate of the target object as the target object moves along the closed path.

18. The machine of claim 17, wherein the processor is further configured to:
  correlate the relative position of the target object to the imaging data when the movable objects are moving along the closed path so that the target object is tracked along said closed path.

19. The machine of claim 17, wherein display is configured to:
  display the virtual overlay anchord to a representation of the target object when the movable objects are moving along said closed path.

20. The machine of claim 17, wherein the display is configured to display the virtual overlay comprising a visual indicator of process parameters associated with the target object.

\* \* \* \* \*

UNITED STATES PATENT AND TRADEMARK OFFICE
CERTIFICATE OF CORRECTION

PATENT NO. : 11,169,597 B2  
APPLICATION NO. : 16/650329  
DATED : November 9, 2021  
INVENTOR(S) : Paolo Scarabelli et al.

Page 1 of 1

It is certified that error appears in the above-identified patent and that said Letters Patent is hereby corrected as shown below:

In the Specification

In Column 3, Line 31, delete "FIG." and insert --FIGS.--.

In the Claims

In Column 9, Line 27, Claim 3, delete "moveable" and insert --movable--.

In Column 9, Line 32, Claim 5, delete "clam" and insert --claim--.

In Column 9, Line 49, Claim 8, delete "clam" and insert --claim--.

In Column 9, Line 58, Claim 10, delete "clam" and insert --claim--.

In Column 10, Line 3, Claim 11, delete "moveable" and insert --movable--.

In Column 11, Line 9, Claim 19, delete "anchord" and insert --anchored--.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*